United States Patent
Abusalem et al.

(10) Patent No.: US 11,919,635 B2
(45) Date of Patent: Mar. 5, 2024

(54) UNMANNED AERIAL VEHICLES ENERGIZED BY POWER LINES

(71) Applicant: Saudi Arabian Oil Company, Dhahran (SA)

(72) Inventors: Khaled F. Abusalem, Dhahran (SA);
Soliman A. Al-Walaie, Dhahran (SA);
Osama Bakur Bahwal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 83 days.

(21) Appl. No.: 17/682,736

(22) Filed: Feb. 28, 2022

(65) Prior Publication Data
US 2023/0271701 A1    Aug. 31, 2023

(51) Int. Cl.
| | |
|---|---|
| *B64C 39/02* | (2023.01) |
| *B60L 53/53* | (2019.01) |
| *B60L 58/12* | (2019.01) |
| *B64U 50/34* | (2023.01) |
| *B64U 70/80* | (2023.01) |

(52) U.S. Cl.
CPC ............ *B64C 39/022* (2013.01); *B60L 53/53* (2019.02); *B60L 58/12* (2019.02); *B64C 39/024* (2013.01); *B64U 50/34* (2023.01); *B64U 70/80* (2023.01)

(58) Field of Classification Search
CPC ........ B60L 53/53; B60L 58/12; B64C 39/024; B64U 70/80; B64U 50/34
See application file for complete search history.

(56) References Cited

U.S. PATENT DOCUMENTS

| | | | | |
|---|---|---|---|---|
| 7,318,564 | B1* | 1/2008 | Marshall | B64C 39/024 244/12.3 |
| 8,167,234 | B1* | 5/2012 | Moore | B64C 37/00 244/17.23 |
| 9,192,798 | B2* | 11/2015 | Dunster | A62C 13/72 |
| 9,440,102 | B2* | 9/2016 | Fernstrum | A62C 37/44 |
| 9,878,787 | B2 | 1/2018 | Chan et al. | |
| 10,822,080 | B2* | 11/2020 | Kirkbride | B60L 5/04 |
| 2008/0017393 | A1 | 1/2008 | Whitney | |
| 2011/0155397 | A1* | 6/2011 | Icove | G08B 29/183 169/16 |

(Continued)

FOREIGN PATENT DOCUMENTS

EP    1534394    6/2005

OTHER PUBLICATIONS

U.S. Appl. No. 17/326,031, Abusalem et al., filed May 20, 2021.
(Continued)

*Primary Examiner* — Justin M Benedik
(74) *Attorney, Agent, or Firm* — Fish & Richardson P.C.

(57) ABSTRACT

An unmanned aerial vehicle (UAV) system energized by power lines includes a UAV, a charging mechanism and an electric circuit. The charging mechanism is operatively coupled to a body of the UAV. The charging mechanism can connect to power transmission lines deployed near an air space in which the UAV is airborne and operating. The charging mechanism can draw power from the power transmission lines to power a flight of the UAV. The electric circuit is onboard the UAV. The electric circuit can generate charging currents based on the power drawn from the power transmission lines to power the flight of the UAV while the UAV is airborne.

14 Claims, 3 Drawing Sheets

(56) References Cited

U.S. PATENT DOCUMENTS

| | | | | |
|---|---|---|---|---|
| 2013/0134254 A1* | 5/2013 | Moore | B64C 39/022 | 244/17.11 |
| 2013/0175390 A1* | 7/2013 | Woodworth | B64D 27/26 | 244/54 |
| 2014/0303814 A1* | 10/2014 | Burema | A01C 21/00 | 901/1 |
| 2015/0175276 A1* | 6/2015 | Koster | B64F 1/00 | 244/114 R |
| 2016/0196756 A1* | 7/2016 | Prakash | G06Q 10/083 | 701/3 |
| 2016/0354626 A1* | 12/2016 | McNamara | A62C 35/023 | |
| 2017/0015414 A1* | 1/2017 | Chan | B64C 39/024 | |
| 2017/0015415 A1* | 1/2017 | Chan | B64C 39/024 | |
| 2018/0257774 A1* | 9/2018 | Volpi | B25J 11/00 | |

OTHER PUBLICATIONS akronbrass.com, [online], "3486 StreamMaster II with AVM 2000 GPM (7600 LPM)," available on or before 2019, retrieved on Feb. 6, 2020, retrieved from URL <https://www.akronbrass.com/monitors/stream-master-ii-with-avm>, 3 pages.

Angus Fire, "Firefighting Monitors," available on or before Dec. 1, 2019, retrieved on Feb. 6, 2020, retrieved from URL <https://angusfire.co.uk/wp-content/uploads/Monitors-8pp-Brochure-RS.pdf>, 8 pages.

crdsolution.com, [online], "Automatic Fire Water Monitor," available on or before 2016, retrieved on Feb. 6, 2020 retrieved from URL <cfdsolution.com/automatic-fire-water-monitor/>, 2 pages.

Horell, "Testing the waters: a new challenge for the wireless power lab drone," Imperial College London, Jun. 2019, 6 pages.

Junaid et al., "Autonomous Wireless Self-Charging for Multi-Rotor Unmanned Aerial Vehicles," Energies, 2017, 10(803), 14 pages.

Loughran, "Wirelessly Powered Drone Enables Indefinite Flight Time," E&T, Engineering and Technology, Oct. 20, 2016, retrieved on Jul. 19, 2021, retrieved from URL <https://eandt.theiet.org/content/articles/2016/10/wirelessly-powered-drone-enables-indefinite-flight-time/>, 6 pages.

Rasi et al., "New Method for Data Communication over Power-Line Career," International Journal of Advanced Biotechnology and Research (IJBR), Jul. 2016, 7(5):993-1002, 11 pages.

* cited by examiner

UNMANNED AERIAL VEHICLES ENERGIZED BY POWER LINES

TECHNICAL FIELD

This disclosure relates to unmanned aerial vehicles (UAVs) and particularly to applying UAVs to urban and suburban air mobility to transport people and cargo.

BACKGROUND

The emergence of a new generation of powerful, high speed, environmentally friendly, economic and sustainable electric autonomous/manned UAVs has leveraged the sky for urban-air-mobility to transport people and cargo. A holistic approach to seamlessly integrate different components including costly infrastructural, strict regulatory requirements, and technical challenges can make such UAVs more available to transport people and cargo.

SUMMARY

This disclosure relates to UAVs energized by power-lines.

Certain aspects of the subject matter described here can be implemented as an unmanned aerial vehicle (UAV) system. The UAV system includes a UAV, a charging mechanism and an electric circuit. The charging mechanism is operatively coupled to a body of the UAV. The charging mechanism can connect to power transmission lines deployed near an air space in which the UAV is airborne and operating. The charging mechanism can draw power from the power transmission lines to power a flight of the UAV. The electric circuit is onboard the UAV. The electric circuit can generate charging currents based on the power drawn from the power transmission lines to power the flight of the UAV while the UAV is airborne.

An aspect combinable with any other aspect includes the following features. The UAV is a vertical take-off and landing (VTOL) type UAV.

An aspect combinable with any other aspect includes the following features. The UAV is a hybrid UAV.

An aspect combinable with any other aspect includes the following features. The charging mechanism includes a pantograph having a first end operatively coupled to the body of the UAV and a second end operatively coupled to the power transmission lines.

An aspect combinable with any other aspect includes the following features. The pantograph can maintain continuous contact with the power transmission lines when the UAV is airborne.

An aspect combinable with any other aspect includes the following features. The UAV system includes multiple wireless fidelity (Wi-Fi) routers, each mounted to a respective power transmission line. Each Wi-Fi router can wirelessly exchange data signals with the UAV while the UAV is airborne in a vicinity of each Wi-Fi router.

An aspect combinable with any other aspect includes the following features. Each Wi-Fi router is powered by the power transmission line to which the Wi-Fi router is mounted.

An aspect combinable with any other aspect includes the following features. Each Wi-Fi router is mounted nearer to the power transmission line than the ground.

An aspect combinable with any other aspect includes the following features. The UAV system includes a Wi-Fi transceiver mounted to the UAV. The Wi-Fi transceiver can wirelessly exchange data signals with each Wi-Fi router while the UAV is airborne in the vicinity of a Wi-Fi router.

Certain aspects of the subject matter described here can be implemented as a method. A UAV performs an unmanned aerial operation. The UAV includes a charging mechanism that is operatively coupled to a body of the UAV. The charging mechanism can connect to power transmission lines deployed near an air space in which the UAV is performing the unmanned aerial operation. The charging mechanism can draw power from the power transmission lines to power the unmanned aerial operation. An electric circuit is onboard the UAV. The electric circuit can generate charging currents based on the power drawn from the power transmission lines to power the unmanned aerial operation. While performing the unmanned aerial operation, the charging mechanism draws power by continuous contact with the power transmission lines. The electric circuit charges the UAV using the drawn power such that the UAV continues to perform the unmanned aerial operation.

An aspect combinable with any other aspect includes the following features. The UAV is a VTOL type UAV.

An aspect combinable with any other aspect includes the following features. The UAV is a hybrid UAV.

An aspect combinable with any other aspect includes the following features. The charging mechanism includes a pantograph having a first end operatively coupled to the body of the UAV and a second end operatively coupled to the power transmission lines. The charging mechanism draws power through continuous contact of the pantograph with the power transmission lines.

An aspect combinable with any other aspect includes the following features. While the UAV is performing the unmanned aerial operation, the UAV wirelessly exchanges data signals with each of multiple Wi-Fi routers mounted to a respective power transmission line and in a vicinity of the UAV.

An aspect combinable with any other aspect includes the following features. Each Wi-Fi router is powered by the power transmission line to which the Wi-Fi router is mounted.

An aspect combinable with any other aspect includes the following features. Data signals are wirelessly exchanged between each Wi-Fi router and a Wi-Fi transceiver mounted to the UAV.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes systems and methods for extending an endurance of electric UAVs, e.g., both vertical and horizontal (fixed-wing) takeoff and landing (VTOL) UAVs or hybrid UAVs. Hybrid VTOL/fixed-wing UAVs offer combination of multirotor platforms (VTOL) with fixed-wing and transition between the two modes during flight (takeoff, hovering and landing). Some implementations incorporate a charging mechanism that is operatively coupled to (e.g., mounted and electrically connected to) the UAV. When the UAV is flying, the charging mechanism maintains a continuous, physical contact between two points on the power transmission line, thereby drawing power to the UAV from the transmission lines. In the context of this disclosure, "continuous, physical contact" does not require that the UAV always be in physical contact with the UAV. Rather, continuous, physical contact can mean physical contact with the power lines for a duration of time and non-contact for a brief duration in which the UAV switches between transmission towers. In durations of non-contact, the UAV may not receive any power and can operate based on charge stored in an onboard battery. Alternatively or in addition, in durations of non-contact, the UAV may receive power by magnetic flux emitted by the high-voltage power transmission lines. In such implementations, the UAV can include an onboard induction circuitry that can convert the magnetic flux into current that can be used to power the UAV's flight and/or charge the UAV's onboard battery (or battery bank).

The UAV includes an onboard electric circuit that can generate charging currents to power the flight of the UAV based on the power drawn from the power transmission lines. In this manner, the UAV is charged while airborne, and its endurance (i.e., ability to maintain flight) can be extended. Implementations of the techniques described here can overcome the travel time limitation of conventional configurations. Moreover, some implementations can utilize the high-voltage transmission lines to remotely communicate control and data signals to the UAV, thereby extending the flight range up to hundreds of kilometers. In addition, this implementation addresses regulatory concerns where space surrounding the power lines (air/space corridor) are utilized as space high ways.

Figure 1A:
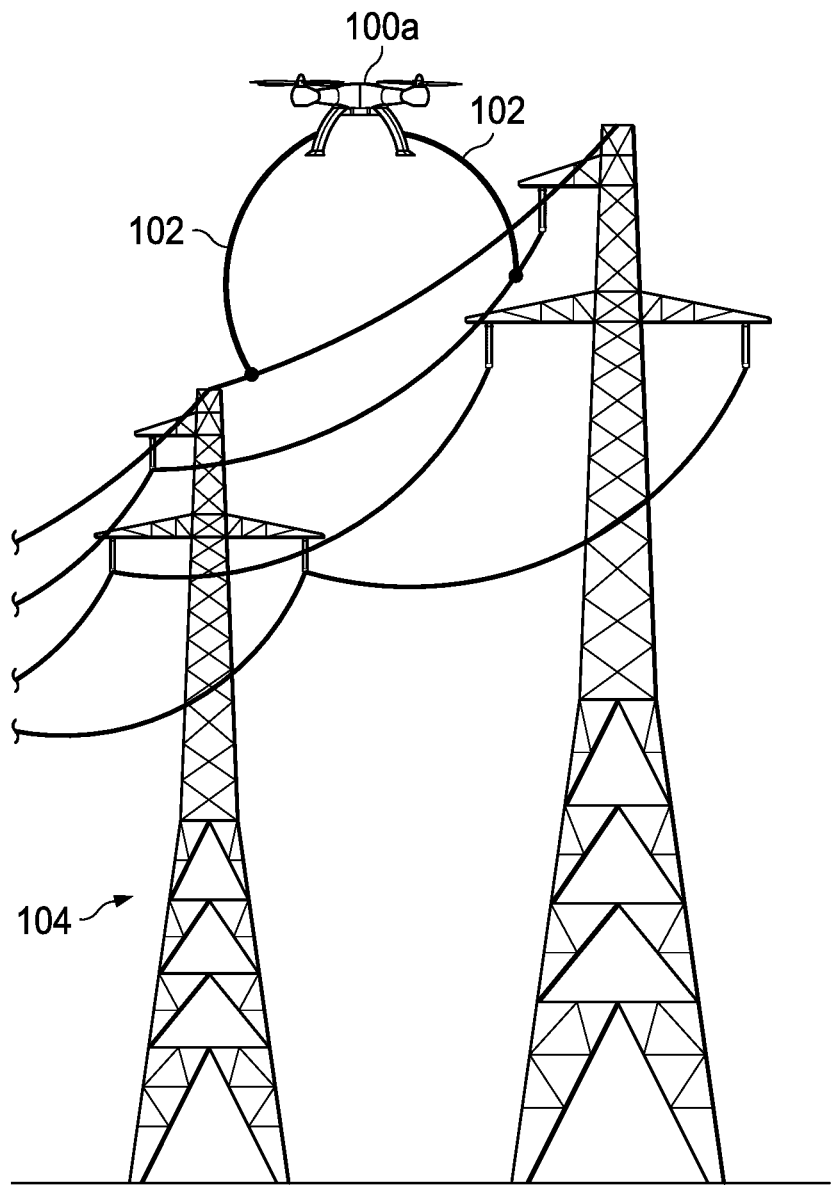
FIGS. 1A and 1B are each a schematic diagram of an example of a UAV being charged by transmission lines while airborne.
Figure 1B:
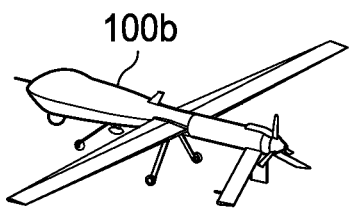

FIGS. 1A and 1B are each a schematic diagram of an example of a UAV being charged by transmission lines while airborne. FIG. 1A shows an example of charging a UAV 100a based on a self-powering payload, which includes an electric circuit (described later). As illustrated, UAV 100a can be a quadcopter drone with VTOL capabilities. Alternatively, as illustrated in FIG. 1B, the UAV can be UAV 100b, which is a Fixed wing and/or hybrid UAV. Each of UAV 100a and 100b can have the self-powering payload described in this disclosure. The UAV (UAV 100a or UAV 100b) is deployed along fixed corridors adjacent to high-voltage power transmission lines 104 for urban/suburban air mobility to transport people and material (Cargo). As described in this disclosure, the UAV 100a is in continuous, physical contact with the power transmission lines 102 via a charging mechanism 102 that draws power from the power transmission lines 104. The electric circuit onboard the UAV 100a receives the power through the charging mechanism 102, converts the power into current (or charge), and uses the current (or charge) to power the flight of the UAV 100a. The entire operation occurs while the UAV 100a is airborne. The operations described here can be implemented with any type of UAV that relies on electrical power for flight and performing other operations.

Figure 2:
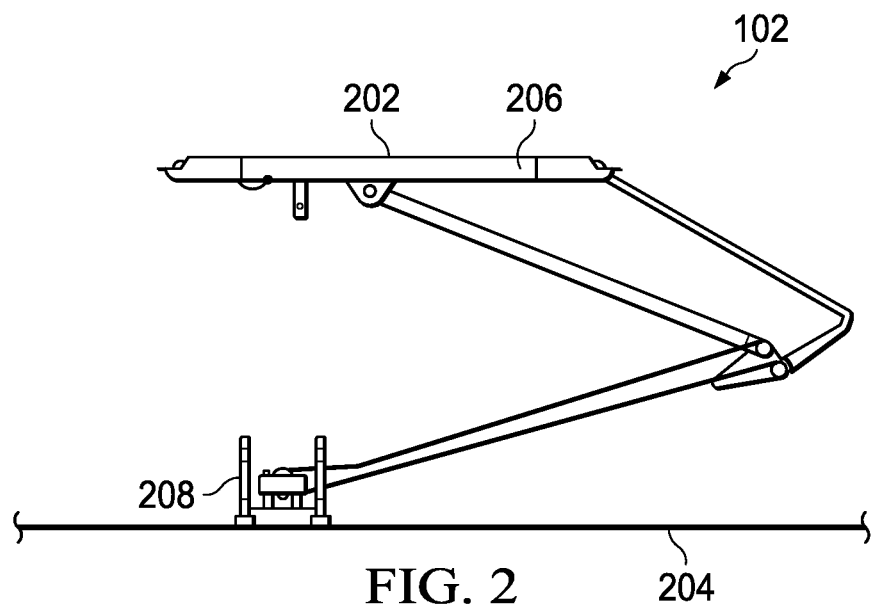
FIG. 2 is a schematic diagram of an example of a charging mechanism for the UAV of each of FIGS. 1A and 1B.

FIG. 2 is a schematic diagram of an example of a charging mechanism 102 for the UAV of each of FIGS. 1A and 1B. In some implementations, the charging mechanism 102 includes a retractable pantograph 202 similar to the apparatus mounted on the roof of an electric train, electric tram or electric bus. The pantograph 202 is in continuous contact with a wire or cable 204 of the power transmission line 104. The pantograph 202 includes a first end 206 that is mounted to the UAV 100a (e.g., to the body of the UAV 100a) and a second end 208 that is in continuous contact with the wire or cable 204 (or with additional wires or cables of the power transmission line 104 as needed to draw power from the power transmission lines 104). Alternatively or in addition, the charging mechanism 102 can include a pole and pulley/wheel or a combination of a pantograph and a catenary (e.g., a weight-carrying wire from which is suspended a contact wire).

In some implementations, the UAV 100a includes a gimbal (not shown) that utilizes electromagnetic induction for charging an on-board battery of the UAV 100. The gimbal can include a set of gimbals each providing a pivoted support that permits rotation of the payload about an axis. In some implementations, electro-mechanical gyroscope can also be used to provide the pivoted support for a mounted self-power payload (electric circuit 302 shown in FIG. 3). The electric circuit 302 includes a coil and an electric board, that can take various configurations and forms. In some implementations, the payload can be custom built for the UAV 100a. In some implementations, the payload can be a stand-alone component capable of being integrated into a commercially available UAV such as the UAV 100a or UAV 100b.

In operation, after the UAV 100a becomes airborne, the pantograph 202 engages the power transmission lines 104 and maintains continuous, physical contact with the power transmission lines 104. The UAV 100a is configured to fly in a fixed space corridor surrounding the power transmission lines 104. Doing so allows the UAV 100a to maintain the continuous, physical contact with the lines 104. Also, the pantograph 202 is retractable meaning that the pantograph 202 can kick back and forth at points of discontinuities (e.g., when the pantograph 202 encounters or is about to encounter a transmission tower that supports the power transmission line). In some implementations, sensors (e.g., motion sensors) can be mounted on the pantograph 202, and a computer system use signals from the motion sensors to retract and extend the pantograph 202 to avoid contact with such points of discontinuities. In some implementations, the UAV can implement artificial intelligence and other image processing techniques to automatically extend and retract the pantograph 202. Also, UAV speed can be balanced during charging period by pushing spring-loaded replaceable graphite contact shoe to cause the pantograph 202 to come into direct contact with the power transmission line.

Figure 3:
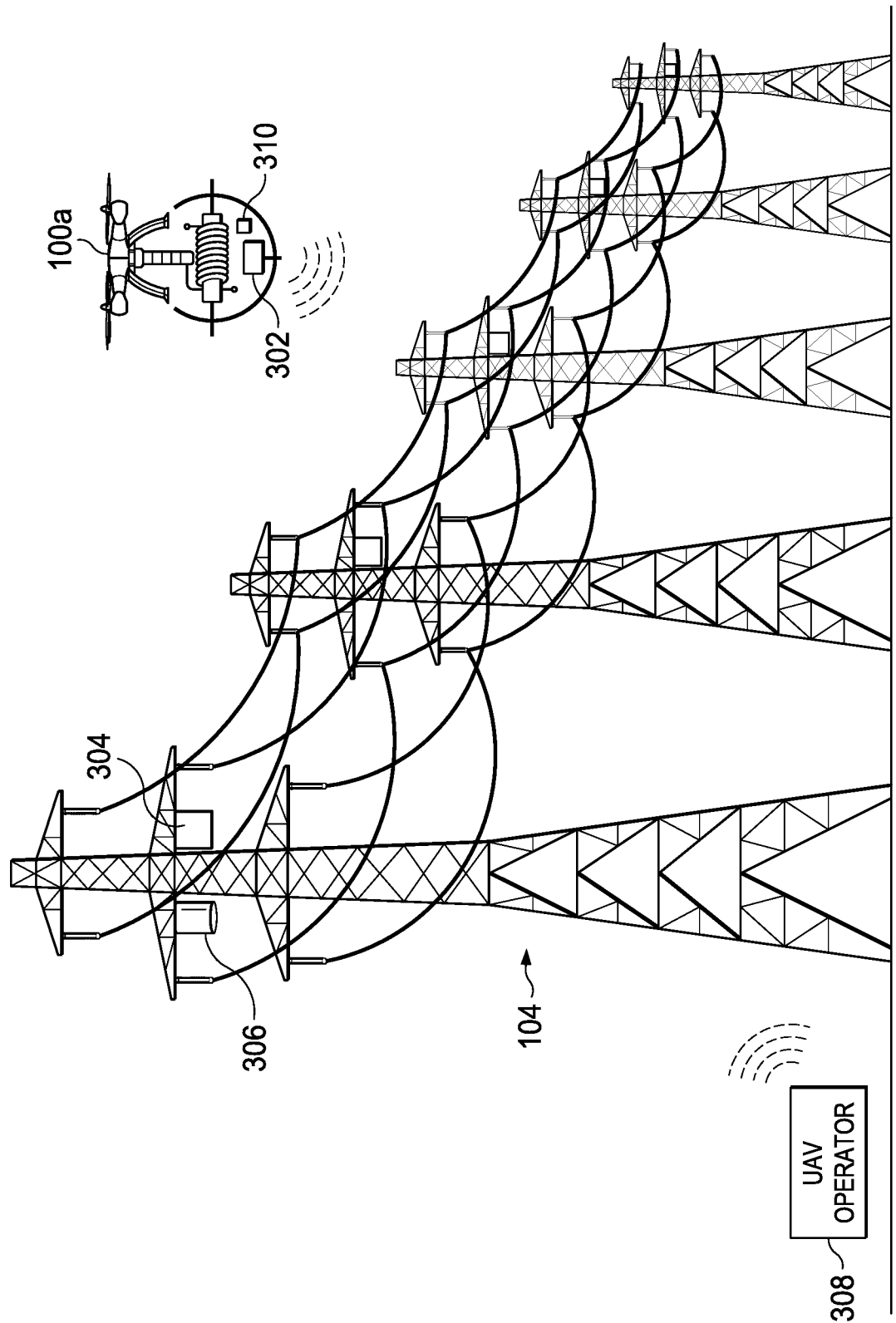
FIG. 3 is a schematic diagram of an example of the UAV exchanging data signals with wireless fidelity routers mounted on the transmission lines.

FIG. 3 is a schematic diagram of an example of the UAV 100a exchanging data signals with wireless fidelity (Wi-Fi) routers 304 mounted on the transmission lines 104. Using the Wi-Fi routers, a UAV operator 308 (e.g., a remote control center) can remotely communicate control and data signals to each other and to the UAV 100a. The UAV operator 308, during non-autonomous mode of operation, can operate and control the UAV 100a. As illustrated, each transmission tower can be mounted with a distribution transfer 306 and a Wi-Fi router 304. The UAV operator 308 can initiate a communication session with UAV 100a by opening a wireless connection with, e.g., a router 304 on a nearby transmission tower 104. In some cases, the Wi-Fi router 304 can be a 5G device that includes an antenna. The router 304 can be powered by the transmission tower. For example, the router 304 can be mounted near the power transmission line (and farther from the ground), and receive power from the same wire or cable that the pantograph 202 (FIG. 2) contacts.

The routers on the transmission towers can relay communication signals (e.g., data and/or control signals) back and forth between the UAV operator 308 and the UAV 100a. To do so, the UAV 100a can include a Wi-Fi transceiver 310 (or a wired transceiver) mounted to the UAV 100a. The transceiver 310 can wirelessly exchange data signals with each router 304 while the UAV 100a is airborne and in the vicinity of a router 304.

In this manner, the communication range between the UAV operator 308 and the UAV 100a can be extended to hundreds of kilometers. In some implementations, the communication can leverage broadband over power lines where a Wi-Fi router will be placed evenly through the power lines to establish continuous radio coverage while UAV is flying between the transmission towers by following the transmission-line corridor. In some implementations, not all routers mounted on the transmission lines need be Wi-Fi routers. Rather, because the transmission lines are in contact with each other and because the pantograph is in continuous, physical contact with the power transmission lines, at least some of the routers can be wired routers that can exchange data and control signals through wired connections.

As a result, the UAV 100a can remain airborne for hours of continuous operation while being charged by the voltage flowing through the power transmission lines 104 with which the UAV 100a is in continuous contact. In addition, the UAV 100a can be operated remotely from a long distance in the range of hundreds of kilometers. Indeed, by utilizing power lines as communication link, data and live video can be transmitted or received over the range of up to hundreds of kilometers.

Figure 4:
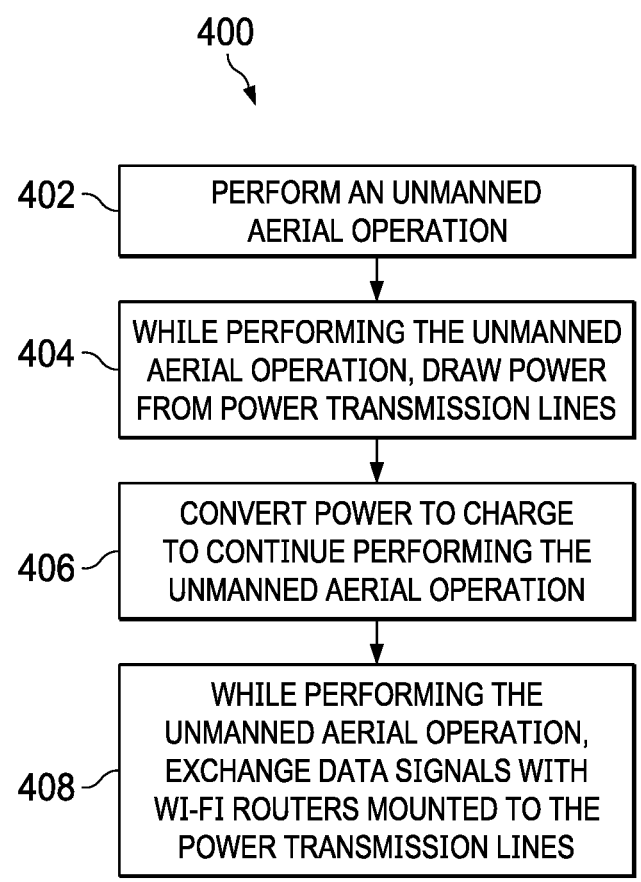
FIG. 4 is a flowchart of an example of a method implemented by the UAV of each of FIGS. 1A and 1B.

FIG. 4 is a flowchart of an example of a method 400 implemented by the UAV of each of FIGS. 1A and 1B. At 402, the UAV performs an unmanned aerial operation, e.g., self-powered flight. At 404, while performing the unmanned aerial operation, the UAV draws power from power transmission lines. For example, a charging mechanism is mounted to the UAV and is in continuous, physical contact with the power transmission lines to draw power from the lines. At 406, the UAV converts the power to charge to continue performing the unmanned aerial flight. For example, the onboard electric circuit receives the power from the power transmission lines and converts the received power into charge or electricity to power the UAV's flight. The charge or electricity can also be used to charge onboard battery banks to power the UAV's flight when not receiving power from the power transmission lines, e.g., during take-off or landing or sometimes during the flight. Optionally, at 408, while performing the unmanned aerial operation, the UAV can exchange data signals with routers mounted to the power transmission lines.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An unmanned aerial vehicle (UAV) system comprising:
   a UAV;
   a charging mechanism operatively coupled to a body of the UAV, the charging mechanism configured to connect to power transmission lines deployed near an air space in which the UAV is airborne and operating, the charging mechanism configured to draw power from the power transmission lines to power a flight of the UAV;
   an electric circuit onboard the UAV, the electric circuit configured to generate, based on the power drawn from the power transmission lines, charging currents to power the flight of the UAV while the UAV is airborne;
   a plurality of wireless fidelity (Wi-Fi) routers, each mounted to a respective power transmission line, each Wi-Fi router configured to wirelessly exchange data signals with the UAV while the UAV is airborne in a vicinity of each Wi-Fi router.

2. The UAV system of claim 1, wherein the UAV is a vertical take-off and landing (VTOL) type UAV.

3. The UAV system of claim 1, wherein the UAV is a hybrid UAV.

4. The UAV system of claim 1, wherein the charging mechanism comprises a pantograph having a first end operatively coupled to the body of the UAV and a second end operatively coupled to the power transmission lines.

5. The UAV system of claim 4, wherein the pantograph is configured to maintain continuous contact with the power transmission lines when the UAV is airborne.

6. The UAV system of claim 1, wherein each Wi-Fi router is powered by the power transmission line to which the Wi-Fi router is mounted.

7. The UAV system of claim 1, wherein each Wi-Fi router is mounted nearer to the power transmission line than the ground.

8. The UAV system of claim 1, further comprising a Wi-Fi transceiver mounted to the UAV, the Wi-Fi transceiver configured to wirelessly exchange data signals with each Wi-Fi router while the UAV is airborne in the vicinity of a Wi-Fi router.

9. A method comprising:
   performing, by an unmanned aerial vehicle (UAV), an unmanned aerial operation, wherein:
      a charging mechanism is operatively coupled to a body of the UAV, the charging mechanism configured to connect to power transmission lines deployed near an air space in which the UAV is performing the unmanned aerial operation, the charging mechanism configured to draw power from the power transmission lines to power the unmanned aerial operation, and
      an electric circuit is onboard the UAV, the electric circuit configured to generate, based on the power drawn from the power transmission lines, charging currents to power the unmanned aerial operation;
   while performing the unmanned aerial operation, drawing, by the charging mechanism and by continuous contact with the power transmission lines, the power;
   charging, by the electric circuit and using the drawn power, the UAV to continue to perform the unmanned aerial operation; and
   while the UAV is performing the unmanned aerial operation, wirelessly exchanging data signals with each of a plurality of wireless fidelity (Wi-Fi) routers mounted to a respective power transmission line and in a vicinity of the UAV.

10. The method of claim 9, wherein the UAV is a vertical take-off and landing (VTOL) type UAV.

11. The method of claim 9, wherein the UAV is a hybrid UAV.

12. The method of claim 9, wherein the charging mechanism comprises a pantograph having a first end operatively coupled to the body of the UAV and a second end operatively coupled to the power transmission lines, wherein drawing the power comprises drawing the power through continuous contact of the pantograph with the power transmission lines.

13. The method of claim 9, further comprising powering each Wi-Fi router by the power transmission line to which the Wi-Fi router is mounted.

14. The method of claim 9, further comprising wirelessly exchanging data signals between each Wi-Fi router and a Wi-Fi transceiver mounted to the UAV.

* * * * *